United States Patent [19]

Weingarten

[11] 4,221,361
[45] Sep. 9, 1980

[54] DIAPHRAGM VALVES

[75] Inventor: Zvi Weingarten, Post Ashrat, Israel

[73] Assignee: Barmad, Post Ashrat, Israel

[21] Appl. No.: 876,883

[22] Filed: Feb. 13, 1978

[30] Foreign Application Priority Data

Jul. 4, 1977 [IL] Israel .................................. 52446

[51] Int. Cl.² ........................... F16K 7/16; F16K 7/17
[52] U.S. Cl. .................................. 251/331; 251/61.1; 137/625.4; 137/883
[58] Field of Search ................ 251/331, 61.1; 137/883, 137/885, 625.4

[56] References Cited
U.S. PATENT DOCUMENTS

| Re. 19,151 | 5/1934 | Saunders | 251/331 |
| 2,478,496 | 8/1949 | Maynard | 251/331 X |
| 3,515,167 | 6/1970 | Berg et al. | 251/331 X |

FOREIGN PATENT DOCUMENTS 1406016  6/1965  France .................................. 251/331

Primary Examiner—Arnold Rosenthal
Attorney, Agent, or Firm—Price, Heneveld, Huizenga & Cooper

[57] ABSTRACT

A spring biased diaphragm valve having circular beads on the diaphragm one of which seats against and within the seat and the other surrounding the spring.

4 Claims, 4 Drawing Figures

DIAPHRAGM VALVES

The present invention concerns diaphragm valves. In the known valves of this kind the diaphragm is operatively connected to the valve disc, the pressure of the flow acting on the diaphragm. According to the predetermined strength of the diaphragm, it will actuate the disc at the corresponding pressure of flow to close or open the valve.

In valves of this kind, the disc which is generally constituted by a metal plate closes quickly onto the seat because the central area of the diaphragm has to be made of relative heavy thickness in order to actuate the disc. This quick closing causes water hammer.

It is the object of the present invention to provide a diaphragm valve in which water hammer is prevented.

The invention consists in a valve comprising a diaphragm which constitutes the valve disc as well as the operating member of the valve.

The invention is illustrated, by way of example only, in the accompanying drawings in which:

FIGS. 1, 2, 3 and 4 show cross-sections through four different embodiments of diaphragm valves.

Figure 1:
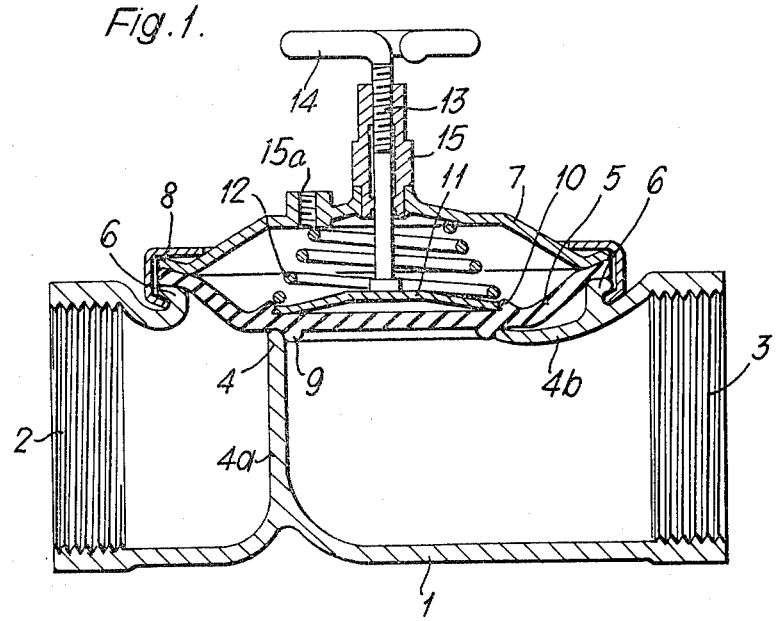

Referring to FIG. 1, in a cast valve housing 1 of the globe-valve type which is provided with connections 2 and 3 for a pipeline, a valve seat 4 of circular cross-section is formed between partitions 4a and 4b. A diaphragm 5 which is held on its periphery between a circular flange 6 provided on the housing 1 and a bonnet 7 held thereto by means of a clamping ring 8 serves as a valve disc, as well as an operating member. The flexible diaphragm 5 is of substantially the same thickness throughout and is provided at the surface engaging the seat 4 with an integral bead 9 and with a similar bead 10 on its opposite surface, a dish-like retaining member 11 urged by a spring 12 being lodged against bead 10. The member 11 may be manually adjusted by means of an integral screw 13 operable by a handle 14 in a threaded boss 15 in bonnet 7.

An opening 15a for a pilot valve is provided in bonnet 7. The spring 12, as well as the thickness of the diaphragm is adjusted to the pressure in the line.

As water flows from inlet 3, it will flow past the diaphragm and into outlet 2, the diaphragm constituting the valve disc as well as the operating member and also providing a perfect seal. For the rest the valve operates as is known from other globe valves having pilots therein.

Figure 2:
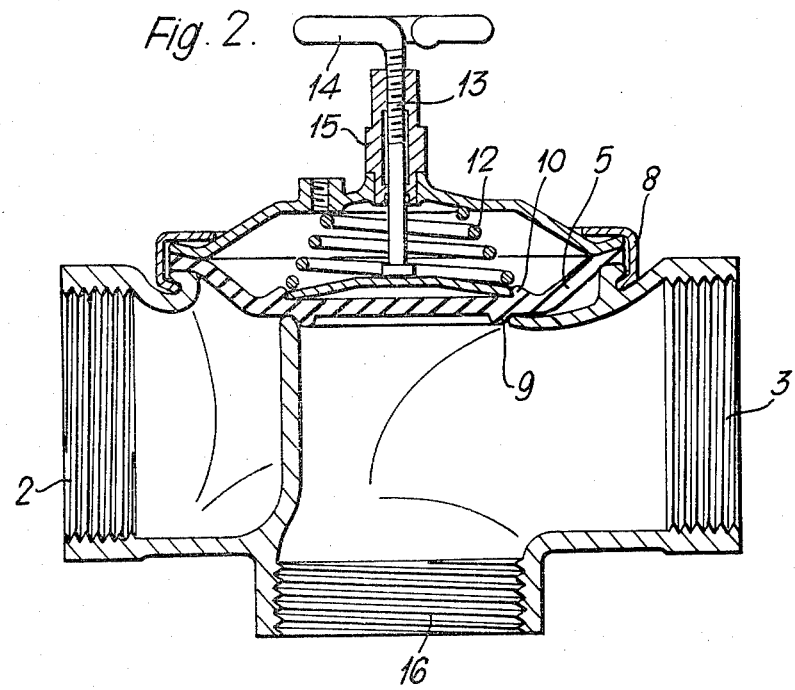

The parts in FIG. 2 which are similar to those of FIG. 1 are referenced by the same numerals. The difference here is the T-construction of the housing having besides connections 2 and 3 also connection 16 at right angles thereto so that either inlet flow may be via openings 3 and 16 and outflow via outlet 2 or vice versa, inflow may be through inlet 2 and outflow may be through outlets 16 and 3.

Figure 3:
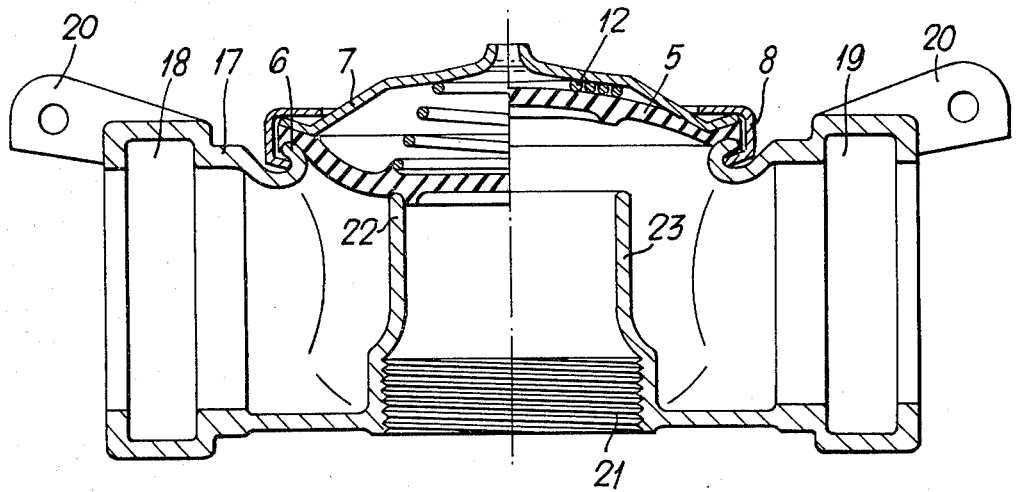

The parts in FIG. 3 which are similar to those of FIGS. 1 and 2 are again referenced by the same numerals. In this construction the cast of molded housing 17 has connections 18, 19 to the line which may be attached by means of lugs 20 and an opening 21 at right angles to connections 18, 19. The valve seat 22 is formed in the centre by a tubular boss 23 within housing 17. Diaphragm 5 is held in circular flanges 6 on the housing 17 by means of bonnet 7 and clamping ring 8 and is urged by means of spring 12 against the seat 22. In this example, inflow may occur through connections 18, 19 and outflow through connection 21 or, conversely, inflow may be through connection 21 and outflow through connections 18 and 19.

Figure 4:
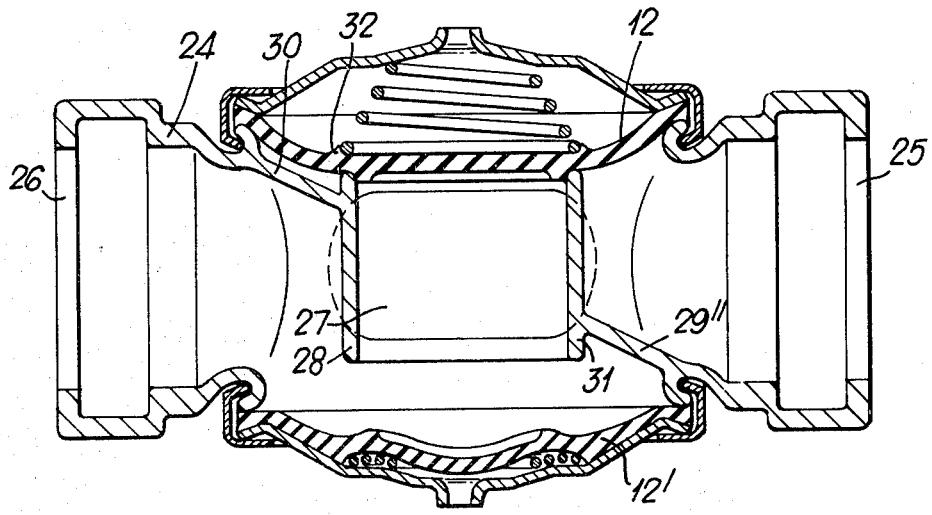

In FIG. 4 a cast or moulded valve housing 24 is shown which comprises two diaphragms 12, aligned axial connections 25, 26 and connection 27 at right angles thereto. In the housing 24 a tubular member 28 is held by means of integral moulded ribs 29, 30, its circular edges 31, 32 constituting two valve seats to co-operate with diaphragms 12, 12', respectively.

The diaphragms 12, 12' operate alternatingly, permitting through-flow from connection 27 to 26 via open valve seat 31, while the flow to connection 25 is closed (as shown in FIG. 4), or from connection 27 to connection 25 when diaphragm 12' is closed onto valve seat 31 while diaphragm 12 is removed from seat 32.

The opering and closing of the diaphragm 5 in FIG. 3 and of the diaphragm's 12 and 12' in FIG. 4 can be effected by pressure differential between that of the fluid and that of the respective springs in a manner well known in the valve art.

For proper operation it is desirable that the seat area of the diaphragms shown in the drawings consititutes approximately $\frac{1}{4}$ to $\frac{1}{3}$ of the area of the entire diaphragm.

I claim:

1. A valve having a body, said body having a passage for liquids extending therethrough; a barrier extending across said passage having a circular opening therethrough; said circular opening forming a valve seat; a flexible diaphragm having a circular center portion and an annular outer portion integral with and surrounding said central portion; means clamping the outer periphery of said outer portion to said body and forming a liquid type seal therewith; the central and outer portions of said diaphragm being of substantially the same thickness and said outer portion being of a shallow dish shape when said valve is closed; A first circular bead on said diaphragm projecting from one face and of a diameter to seat against and within said valve seat; a second circular bead projecting from the opposite face of said diaphragm and of a greater diameter than said first bead; resilient means for applying pressure to said diaphragm within said second bead and urging said diaphragm against said valve seat.

2. A valve as described in claim 1 wherein a reinforcement member is seated within and engages said second bead, said reinforcement member being convex and its central portion being arched away from said diaphragm; said resilient means seated against said member.

3. A valve as described in claim 1 wherein the inside diameter of said second bead is greater than the inside diameter of the opening in said valve seat.

4. A valve as described in claim 3 wherein said resilient means seats against the inside of said second bead and is of greater diameter than the inside diameter of said valve seat.

* * * * *